United States Patent Office 3,403,978
Patented Oct. 1, 1968

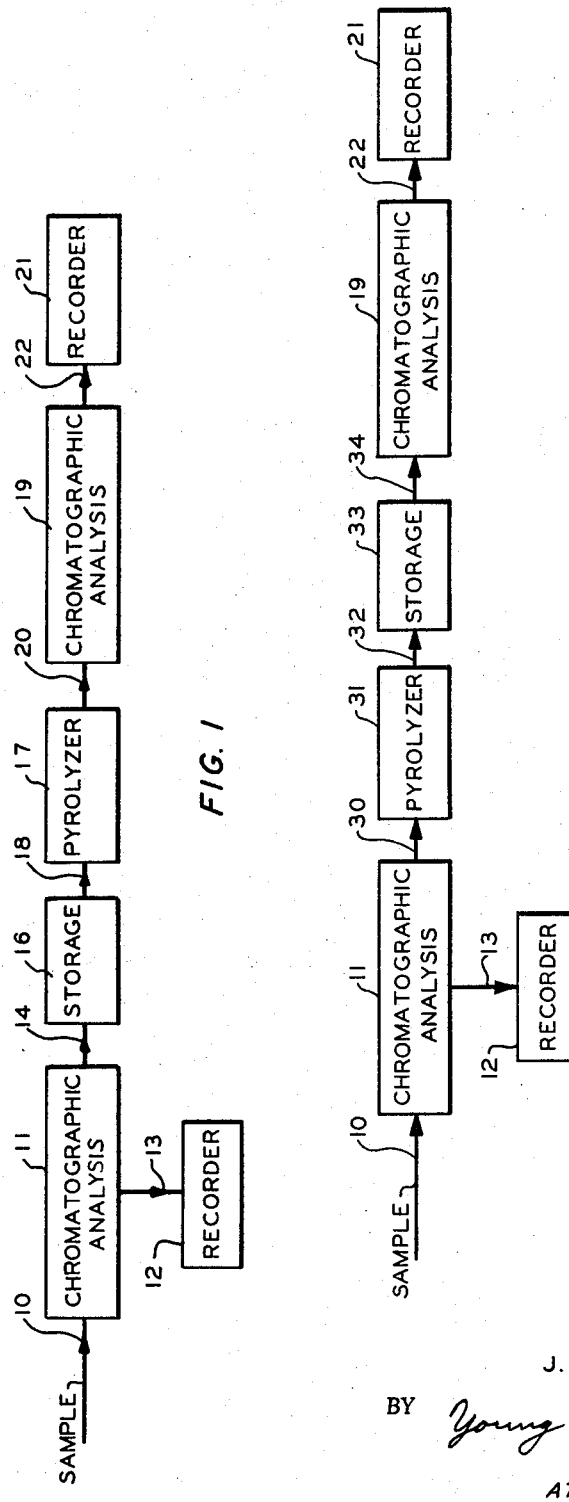

3,403,978
ANALYSIS OF FLUIDS
John A. Favre, Bartlesville, Okla., assignor to Phillips
Petroleum Company, a corporation of Delaware
Filed Dec. 14, 1964, Ser. No. 417,979
6 Claims. (Cl. 23—230)

ABSTRACT OF THE DISCLOSURE

A quantitative analysis system wherein a sample fluid is passed to a chromatographic zone; the individual constituents of the chromatographic zone effluent are separately stored in a storage zone; the stored constituents are individually passed from the storage zone to a pyrolyzer; the effluent from the pyrolyzer is passed to a second chromatographic zone; and the composition of the effluent from the second chromatographic zone is measured. Alternately, the individual constituents of the first chromatographic zone effluent are separately pyrolyzed; the pyrolyzed products of each of the individual constituents are separately stored in a storage zone; the products of each of the constituents are separately passed from the storage zone to a second chromatographic zone; and the composition of the effluent from the second chromatographic zone is measured.

---

This invention relates to a method of analyzing fluids. In another aspect, this invention relates to a quantitative and qualitative method of analysis wherein chromatographic and pyrolysis zones are employed in the analysis of fluid samples.

A method of measuring the concentration of constituents in a fluid conventionally involves the use of a chromatographic analyzer. In elution chromatography, for example, a vapor sample of the mixture to be analyzed is introduced into a column containing a selective sorbent or partitioning material. A carrier gas is directed into the column so as to force the sample therethrough. A selective solvent, or partitioning material, attempts to hold the constituents in the feed mixture. This results in the several constituents in the fluid mixture flowing through the column at different rates of speed, depending upon their affinities for the packing material. The column effluent this consists initially of the carrier gas alone, the individual constituents in the fluid mixture appearing later at spaced time intervals. A conventional method of determining quantitatively the concentration of these constituents is to employ a thermal conductivity detector which compares the thermal conductivity of the effluent gases with the thermal conductivity of the carrier gas directed to the column.

It is desirable, in many cases, that the separated constituents eluted from the chromatographic column be further analyzed to determine qualitatively the molecular structure of the separated constituents. In recent years, it has been observed that pyrolysis, under standardized conditions, of pure organic compounds will give rise to degraded products characteristic of the molecular structure of the organic compound. Thus, a combination of the chromatographic and pyrolysis analysis procedures would provide an analysis method for determining the qualitative and quantitative analysis of fluid samples.

The separated constituents eluted from the chromatographic analyzer cannot be passed directly to the pyrolyzer and from the pyrolyzer to a second chromatographic analyzer. To operate in this manner would result in the pyrolyzed products of the several constituents becoming mixed in the analysis zone following the pyrolyzer, thus making impossible the qualitative determination of the constituents. The time required to pyrolyze each constituent and analyze the products therefrom exceeds the time between consecutive constituents eluted from the chromatographic analysis zone.

Accordingly, an object of my invention is to provide an improved method and apparatus for the analysis of fluids. Another object of my invention is to provide an improved method and apparatus for quantitatively and qualitatively analyzing fluids. Another object of my invention is to provide an improved method and apparatus for the qualitative analysis of fluids.

Other objects, advantages and features of my invention will be readily apparent to those skilled in the art from the following description, the drawing and appended claims.

By my invention, I have provided an improved fluid qualitative and quantitative analysis system wherein a sample fluid is passed to a chromatographic zone; the individual constituents of the chromatographic zone effluent are separately stored in a storage zone; the stored constituents are individually passed at spaced time intervals from the storage zone to a pyrolyzer; and the effluent from the pyrolyzer is passed to a second chromatographic zone. In a second, less preferred, embodiment, a sample fluid is passed to a first chromatographic zone; the individual constitutents of the first chromatographic zone effluent are passed to a pyrolyzer; the products of the pyrolyzer are separately stored in a storage zone; and the stored products passed to a second chromatographic zone.

FIGURE 1 is a schematic representation of one embodiment of my invention.

FIGURE 2 is a schematic representation of a second embodiment of my invention.

Referring to FIGURE 1, a sample fluid is introduced via conduit means 10 into a chromatographic analysis zone 11. Chromatographic analysis zone 11 can comprise a conventional means for passing a fluid sample through a chromatographic zone, such as a column, containing a selective sorbent or partitioning material and a conventional means for determining the concentration of the constituents as emitted from the chromatographic column such as a thermal conductivity detector. It is within the scope of this invention to employ multiple chromatographic columns if desired, and to employ conventional means for vaporizing liquid samples when required. A signal representative of the concentration of each individual constituent emitted from the chromatographic zone via conduit means 14 is passed via conduit means 13 to a conventional recorder 12.

The separated constituents emitted from chromatographic analysis zone 11 is passed via conduit means 14 to storage zone 16 wherein the said separated constituents are stored to be transmitted as required from storage zone 16 via conduit means 18 to pyrolyzer 17. The "storing" of the constituents emitted from the chromatographic zone 11 includes, in addition to the storage in storage zone 16, means for introducing the vaporous constituents into storage zone 16 and for transmitting the said vaporous constituents from storage zone 16. A suitable method and apparatus for the storage of vaporous constituents is described in U.S. Patent 3,306,347. As therein described, the vaporous constituents emitted from the chromatographic zone are trapped in a coiled tube, the vapor pressure of the constituents reduced to prevent the mixing of the separated constituents within the coiled tube and the vaporous constituents are transmitted individually from the coiled tube so as to prevent the mixing of the constituents. Briefly, the vaporous constituents emitted from the chromatographic zone are passed into a coiled tube as the coiled tube is moved into a cold zone and thus the vaporous constituents are trapped at spaced intervals within the coiled tube. To transmit the separated constituents from the storage zone, the direction of movement of the coiled tube is reversed and heat is applied to the tube as the tube is moved from the cold zone, thereby vaporizing the stored constituents and permitting the vaporized stored constituents to pass from the storage zone. The movement of the coiled tube into and out of the cold storage zone is controlled, thereby permitting a single constituent to be transmitted from the storage zone while maintaining the remaining stored constituents within the cold storage zone.

The separated constituents are individually transmitted via conduit means 18 to pyrolyzer 17 wherein the said constituents are thermally cracked, producing thermally degraded products characteristic of the molecular structure of the constituents passed to pyrolyzer 17. A conventional pyrolyzer such as distributed by Wilkins Instrument and Research Incorporated and described in the Wilkins Instrument and Research Incorporated bulletin published in November 1962 can be employed.

The degraded products of the pyrolysis zone are transmitted via conduit means 20 to a chromatographic analysis zone 19 wherein the gaseous products are passed to a chromatographic zone containing a selected sorbent or partitioning materials capable of selectively retarding the flow of the gaseous products directed thereto. The effluent from the chromatographic zone is passed to a conventional method of determining concentration of the products of the pyrolysis zone such as a thermal conductivity detector. It is within the scope of this invention to employ the same chromatographic analyzer in chromatographic analysis zones 11 and 19.

Signals representative of the concentration of the products of the pyrolysis are transmitted via conduit means 22 to recorder 21. The resulting chromatogram produced by recorder 21 can be compared to chromatograms obtained from the pyrolyzed products of pure compounds. Comparison of the chromatograms will clearly establish qualitatively the molecular structure of the fluid sample introduced into chromatographic analysis zone 11 and serves to identify closely related isomers present in the mixture.

Referring to FIGURE 2, a second embodiment of the invention is therein illustrated. Chromatographic analysis zones 11, 19 and recorders 12, 21 perform functions in the second embodiment identical to their functions in the first described embodiment and will not, therefore, be further discussed in the description of the second embodiment illustrated in FIGURE 2.

The separated constituents emitted from chromatographic analysis zone 11 are passed via conduit means 30 to pyrolyzer 31. Pyrolyzer 31 can be a conventional pyrolyzer such as pyrolyzer 17 of FIGURE 1 wherein the constituents from chromatographic analysis zone 11 are thermally cracked, producing thermally degraded products characteristic of the molecular structure of the constituents passed to pyrolyzer 31.

The degraded products of the pyrolysis zone are transmitted via conduit means 32 to storage zone 33 wherein the said degraded products are stored to be transmitted at spaced time intervals from storage zone 33 via conduit means 34 to chromatographic anaylsis zone 19. The function of storage zone 33 of FIGURE 2 is identical to that of storage zone 16 in FIGURE 1. The pyrolyzed products of each of said constituents are stored separately from the pyrolyzed products of the remainder of said constituents of the sample fluid mixture.

The following example is presented to illustrate the objects and advantages of the invention. It is not intended that the invention should be limited to the specific embodiments presented therein.

EXAMPLE

A mixture comprising 2,2-dimethylbutane and 2,3-dimethylbutane is passed to a chromatographic column having an inside diameter of 4 millimeters and 3 meters in length. The chromatographic column is packed with a partitioning material comprising 10 weight percent of squalane on 50–60 mesh silica gel. The column is operated at 30° C. with hydrogen passed as a carrier gas to the column at a flow rate of 65 cc./min.

2,2-dimethylbutane has a retention time of 46.9 minutes within the chromatographic column and 2,3-dimethylbutane has a retention time of 64.1 minutes within the chromatographic column. Thus, the constituents of the sample mixture are eluted 17.2 minutes apart. The eluted constituents of the sample mixture are stored individually in the continuous trap of storage zone 16 of FIGURE 1. The sample constituents are recovered individually from the continuous trap, pyrolyzed, and the products of the pyrolysis passed to the squalane chromatographic column previously described.

2,3-dimethylbutane requires about 20 seconds for the pyrolysis step and 64.1 minutes to separate the products of the pyrolysis step within the chromatographic column. 2,2-dimethylbutane requires about 20 seconds for the pyrolysis step and 46.9 minutes to separate the products of the pyrolysis step from the 2,2-dimethylbutane. 2,2-dimethylbutane is retained within the continuous trap until the 2,3-dimethylbutane has been pyrolyzed and the products of the pyrolysis step subjected to analysis in the chromatographic analysis zone.

The components, concentrations of said components, and the retention time of said components of the effluent recovered from the pyrolysis zone as determined by the chromatographic analysis zone is presented below in the table for each of the 2,2-dimethylbutane and 2,3-dimethylbutane feeds to the pyrolysis zone.

| Component | Retention time in minutes | Weight percent 2,2-dimethylbutane feed to the pyrolysis zone | Weight percent 2,3-dimethylbutane feed to the pyrolysis zone |
| --- | --- | --- | --- |
| Methane | 2.3 | 9 | 7 |
| Ethylene | 2.9 | | |
| Propylene | 4.8 | 1 | 10 |
| Butene-1, isobutylene and 1,3-butadiene | 10 | 10 | 3 |
| Trans-2-butene | 12.6 | (¹) | 0.5 |
| Cis-2-butene | 13.8 | (²) | Trace |
| 3-methylbutene-1 | 19.0 | | 0.5 |
| Isopentane | 24.4 | | Trace |
| 2-methylbutene-1 | 28.3 | 3 | Trace |
| Isoprene | 31.0 | 2 | 3 |
| 2-methylbutene-2 | 37.4 | 11 | 16 |
| 2,2-dimethylbutane | 46.9 | 63 | |
| 3,3-dimethylbutene-1 | 49.1 | | 6 |
| 2,3-dimethylbutane | 64.1 | | 54 |

¹ 0.5 (+ cis).
² See trans.

As will be evident to those skilled in the art, various modifications of this invention can be made, or followed, in the light of the foregoing disclosure, without departing from the spirit or scope thereof.

I claim:

1. A method of analysis which comprises passing a fluid mixture to a first zone containing a partitioning material that selectively retards the passage therethrouh of the constituents of said fluid mixture, measuring a property of the vaporous effluent of said first zone which is representative of the concentration of constituents contained therein, passing said vaporous first zone effluent to a storage zone wherein said constituents of said effluent are separately stored, individually passing each of said stored constituents to a pyrolysis zone wherein each of said constituents is pyrolyzed, passing the resultant products of said pyrolysis to a second zone containing a partitioning material that selectively retards the passage therethrough of said products of said pyrolysis zone, and measuring a property of the effluent from said second zone representative of the composition thereof.

2. A method of analysis which comprises passing a fluid mixture to a first zone containing a partitioning material that selectively retards the passage therethrough of the constituents of said fluid mixture, measuring a property of the vaporous effluent from said first zone representative of the concentration of said constituents contained therein, passing said vaporous effluent to a storage zone wherein said constituents of said effluent are separately stored, individually passing each of said constituents to a pyrolysis zone wherein each of said constituents is pyrolyzed, passing the products of said pyrolysis to said first zone, and measuring a property of the effluent from said first zone containing said products of said pyrolysis zone which is representative of the composition thereof.

3. A method of analysis which comprises passing a fluid mixture to a first zone containing a partitioning material that selectively retards the passage therethrough of the constituents of said fluid mixture, measuring a property of the vaporous effluent from said first zone which is representative of the concentration of said constituents contained therein, passing said vaporous effluent to a pyrolysis zone wherein each of said constituents is individually pyrolyzed, passing the resulting pyrolyzed products to a storage zone wherein the products of each of said constituents are separately stored, separately passing said stored products of each of said constituents from said storage zone to a second zone containing a partitioning material that selectively retards the passage therethrough of the products of said pyrolysis, and measuring a property of the vaporous effluent from said second zone representative of the composition thereof.

4. A method of analysis which comprises passing a fluid mixture to a first zone containing a material that selectively retards the passage therethrough of the constituents of said fluid mixture, measuring a porperty of the vaporous effluent from said first zone which is representative of the concentration of the constituents contained therein, passing said vaporous effluent to a pyrolysis zone wherein each of said constituents is individually pyrolyzed, separately passing the resultant products to a storage zone, wherein the products of each of said constituents are separately stored, separately passing said products of each of said constituents from said storage zone to said first zone, and measuring a property of the effluent from said first zone containing said products which is representative of the composition thereof.

5. Apparatus comprising means for passing a fluid mixture through a first zone containing a partitioning material that selectively retards the passage therethrough of the constituents of said mixture, means for measuring a property of the vaporous effluent from said first zone representative of the concentration of said constituents contained therein, means for individually storing said constituents of said first zone effluent, means for individually pyrolyzing said stored constituents, means for passing the resultant pyrolyzed products through a second zone containing a partitioning material that selectively retards the passage therethrough of said pyrolyzed products, and means for measuring a property of the effluent from said second zone representative of the composition thereof.

6. Apparatus comprising means for passing a fluid mixture through a first zone containing a partitioning material that selectively retards the passage therethrough of the constituents of said mixture, means for measuring a property of the vaporous effluent of said first zone representative of the concentration of said constituents contained therein, means for individually pyrolyzing each of said constituents contained in said first zone vaporous effluent, means for separately storing the resultant products of the pyrolysis of each of said constituents, means for passing said resultant products of said pyrolysis from said storage zone through a second zone containing a partitioning material that selectively retards the passage therethrough of said products, and means for measuring a property of the vaporous effluent of said second zone representative of the composition thereof.

References Cited
UNITED STATES PATENTS 3,168,378    2/1962    Maresh et al. _____ 23—230
3,298,786    1/1967    Hinsvark _____ 23—255

FOREIGN PATENTS 880,965    10/1961    Great Britain.

MORRIS O. WOLK, *Primary Examiner.*

R. E. SERWIN, *Assistant Examiner.*